United States Patent Office 2,794,056
Patented May 28, 1957

2,794,056

CATALYST REACTIVATION IN THE HYDROGENATION OF PHENOL TO CYCLOHEXANOL

Leon O. Winstrom, East Aurora, N. Y., assignor to Allied Chemical & Dye Corporation, New York, N. Y., a corporation of New York No Drawing. Application January 19, 1956,
Serial No. 560,056

10 Claims. (Cl. 260—631)

This invention relates to the conversion of phenol to cyclohexanol, and more particularly refers to a new and improved method of catalytically hydrogenating phenol in the liquid phase to cyclohexanol.

Cyclohexanol is an important industrial chemical which is used in the manufacture of intermediates for synthetic resins and polymers. Commercially, cyclohexanol is produced by hydrogenation of liquid phenol in the presence of a nickel catalyst. The process may be carried out by passing hydrogen gas into a body of molten phenol containing a suspended nickel-silica catalyst at elevated temperature and pressure until conversion to cyclohexanol is effected, as more fully described in my co-pending application entitled "Cyclohexanol," Serial No. 554,654, filed December 22, 1955. As is common in catalytic reactions, the activity of the nickel catalyst deteriorates by use in liquid phase hydrogeneration of phenol with resultant impairment of product quality and reduced rate of reaction necessitating relatively frequent replacements with fresh catalyst.

An object of the present invention is to provide a method for reactivating nickel catalysts in the liquid phase hydrogenation of phenol to cyclohexanol.

Another object of the invention is to provide a method for greatly extending the effective operating life of the nickel catalyst in the liquid phase hydrogenation of phenol to cyclohexanol.

A further object of the invention is to provide a method for maintaining high yields of high quality products for prolonged periods in the liquid phase hydrogenation of phenol to cyclohexanol. Other objects and advantages of the present invention will be apparent from the following description.

I have discovered that a nickel catalyst, whose activity has deteriorated by use in liquid phase hydrogenation of phenol, can be reactivated in simple manner by the addition of small amounts of a metal salt of a surface active compound containing 6–30 carbon atoms, said salt having the general formula:

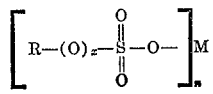

wherein R is an organic radical selected from the group consisting of hydrocarbon radicals and substituted hydrocarbon radicals, $x$ is 1 or 0, M is a member selected from the group consisting of Ni and Ag, and $n$ stands for one of the numbers 1 and 2 and satisfies the valence of M. The preferred compounds are the nickel salts of sulfated alcohols, alkane sulfonic acids, aromatic sulfonic acids, alkyl aromatic sulfonic acids and aralkyl sulfonic acids. Surface active sulfates and sulfonates of this type are known and described in the book entitled "Surface Active Agents" by Schwartz-Perry, 1949. The compounds for use in the present invention may be employed as single compounds or mixtures of these compounds.

Hydrogenation of phenol to cyclohexanol may be carried out by continuous operation but is ordinarily conducted in a batch sequential manner employing one or more enclosed hydrogenation vessels, for example having a capacity of approximately 20,000 pounds of phenol, each equipped with stirrers for agitating the contents. The amount of hydrogenation catalyst based on the amount of phenol charge is not critical and may be varied over a wide range. In practice we have carried out successful hydrogenation with from 2% to about 10% nickel catalyst, preferably within the range of 4–6% catalyst by weight of phenol. The hydrogenation reaction is carried out at a temperature between about 100–200° C., preferably within the range of 120–180° C. The hydrogenation reaction may be carried out under atmospheric pressure but use of superatmospheric pressure shortens reaction time. The reaction may be conveniently carried out at a pressure within the range of 20–250 p. s. i. g. Still higher pressures would be advantageous but large capacity equipment capable of withstanding such pressures is excessively costly. During the reaction pure hydrogen gas need not be employed to effect hydrogenation of the phenol and a gas containing hydrogen, such as a mixture of hydrogen and an inert gas such as nitrogen, may be employed. Hydrogen is introduced into the body of phenol until further hydrogenation substantially ceases as indicated by cessation of hydrogen absorption. After hydrogenation of a batch of phenol is completed, agitation is discontinued and the batch allowed to settle out. The catalyst settles to the bottom as a compact layer containing about 20% of the total cyclohexanol product. The rest of the product is a clear supernatant liquid layer which may be readily decanted. To the residual catalyst layer in the hydrogenation vessel is added a fresh batch of phenol and agitation and hydrogenation of the phenol accomplished in the manner as just described. The time required to complete the hydrogenation of phenol to cyclohexanol depends upon numerous variables: catalyst activity, temperature, pressure, cooling, heat transfer, agitation, etc.

The following is a description of a continuous operation employing a multivessel system. The first of a series of agitator-equipped hydrogenation vessels is continuously charged with molten phenol and a concentrated slurry of catalyst, or a pre-formed mixture of molten phenol and a concentrated slurry of catalyst. At the start-up of process operations the catalyst slurry is prepared by slurrying catalyst in phenol or cyclohexanol; subsequently it is a slurry of catalyst in cyclohexanol which is separated from the effluent stream from the last of the series of hydrogenation reactors and recycled as feed material to the first hydrogenation reactor. The reaction medium containing suspended catalyst overflows from one reactor into a conduit, which carries it (via a pump, if necessary) into the lower part of the next reactor down stream. The phenol is reacted with hydrogen in each reactor at elevated temperatures and pressures. Effluent from the last hydrogenation reactor passes continuously through a separator, such as a cream-separator type centrifuge, which separates a catalyst-free product consisting of substantially pure cyclohexanol from a concentrated slurry of catalyst in cyclohexanol, which slurry is recycled as a feed stream to the first reactor. The activity of the hydrogenation catalyst will depend on the extent of use, which in batch operation would be the number of times the catalyst has been used, that is, fresh catalyst is usually more active than catalyst which has been used a number of times. The catalyst cannot be thus reused indefinitely before its activity declines (apparently by poisoning) to a point that it cannot be further used without unduly sacrificing time cycles or product quality or both. When this point is reached, usually after use in hydrogenation of about 10 batches of phenol, the catalyst is discarded. I have discovered that a nickel catalyst, whose activity has deteriorated by use in liquid phase hydrogenation of phenol, can be reactivated in simple manner without isolation from the reaction mixture by addition of a small amount of nickel and silver compounds of the present invention. I have further discovered that a nickel catalyst may be reactivated repeatedly by the process of my invention whenever its activity declines excessively in such liquid phase hydrogenations, thereby making it possible greatly to extend the operating life of the catalyst, maintaining a high catalyst activity level and high product quality. The amount of additive needed to maintain or restore catalyst activity may be as low as 0.01% by weight of the total phenol charge and generally quantities up to 1.5% additive will be found adequate to restore catalyst activity, although larger amounts of additive may be employed if desired. The addition of additive may be accomplished simply by adding the additive directly to the catalyst slurry or to phenol, which is then admixed with the catalyst, or to a mixture of phenol containing suspended catalyst, or, if desired, the additive may be added to the catalyst by means of another liquid vehicle such as cyclohexanol. Upon the addition of the additive the nickel catalyst is restored to about its original activity and will continue at a high rate of activity for several successive batch hydrogenations without further addition of additive. After a second drop in activity of the catalyst, restoration of the catalyst may again be accomplished by a further addition of a small amount of additive.

The following examples illustrate the present invention and demonstrate its advantages.

EXAMPLE 1

The following is a description of a large scale operation involving production of cyclohexanol by catalytic hydrogenation of phenol in which a nickel catalyst deteriorated by use in hydrogenation of phenol was restored to high activity by addition of a small amount of additive in accordance with the present invention.

The nickel phenol hydrogenation catalyst was prepared as follows:

The catalyst carrier was a finely divided natural chalcedonic cryptocrystalline silica having a particle size range from 4 to 40 microns diameter, a specific surface of 4.21 square meters per gram as determined by the Brunauer-Emmett-Teller low temperature nitrogen absorption method, and an $SiO_2$ content of over 98½%, of which about 80% was $\alpha$ quartz and the balance amorphous silica as determined by X-ray diffraction spectra analysis.

3300 parts of carrier were charged to an agitated vessel containing 5160 parts of an aqueous nickel nitrate solution containing 740 parts nickel. The resulting slurry was cooled to 0.5° C., agitated and charged with 13500 parts by weight of an aqueous solution containing 2150 parts of ammonium carbonate monohydrate. The resulting slurry was agitated for one hour and filtered. The filter cake was reslurried, refiltered, and washed until the sequence had been repeated four times. The washed filter cake was dried at 100–110° C. and ground to pass through an 80-mesh screen. 4470 parts of "green" catalyst comprising silica particles coated with basic nickel carbonate were obtained.

Dried "green" catalyst (1030 parts) was charged to an igniter and heated to 50° C. Ammonia synthesis gas (a mixture of circa 75% $H_2$ and 25% $N_2$) was passed through the igniter at about 10 p. s. i. g. during a 7 hour heat up to 400° C. and a 4 hour retention period at 400° C. The ignited catalyst comprising metallic nickel on silica was cooled to 55° C. in a "synthesis gas" atmosphere and maintained in such atmosphere until used.

The additive for restoring the activity of the nickel hydrogenation catalyst was a nickel salt of keryl benzene sulfonic acid, called "nickel Nacconol," prepared as follows:

A refined higher alkylbenzene ("keryl benzene") was prepared in a manner similar to that described in U. S. P. 2,364,782 by chlorinating a kerosene fraction of petroleum distillate, condensing the resulting chlorination product with benzene in the presence of anhydrous aluminum chloride; separating the alkylbenzene containing oil from the condensation reaction mixture by decantation; and recovering an alkyl benzene mixture by fractional distillation of the oil.

The kerosene fraction had a boiling range from about 198° to 251° C. and consisted predominantly of $C_{12}$—$C_{14}$ paraffin and naphthene hydrocarbons. The resulting "keryl" benzene had an average molecular weight of 260 to 265.

4600 parts of keryl benzene were agitated for 30 minutes at 38 to 42° C. with 846 parts of 100% sulfuric acid. The mixture was allowed to stratify. The lower acid layer was drawn off. The resulting acid extracted oil was charged with 6450 parts of 100% sulfuric acid. The mixture was agitated for one hour at 58–60° C., diluted with 460 parts cold water, agitated for 15 minutes, and allowed to settle out for 2½ hours. The lower layer of spent acid was withdrawn. The resulting crude keryl benzene sulfonic acid was agitated for 15 minutes at 64° C. with 276 parts of diethylene glycol. The mixture was allowed to settle out for 5 hours at 70° to 72° C. The lower layer of diethylene glycol and sulfuric acid extracted thereinto was withdrawn.

One part of purified keryl benzene sulfonic acid was diluted with two parts of water. The solution was agitated with decolorizing charcoal and filtered. Solid nickelous carbonate was added incrementally, forming soluble nickelous keryl benzene sulfonate or "nickel Nacconol" until completion of reaction was indicated by a neutral pH test and the presence of undissolved excess nickel carbonate. The batch was filtered. The filtrate was dried to recover the product.

22 consecutive batches of phenol were hydrogenated in an agitated pressure vessel charged with molten phenol and 860 pounds of nickel-on-silica catalyst prepared as described in the fore part of this example. The pertinent results of these hydrogenation reactions are summarized in Table 1.

The molten slurry of phenol and catalyst was agitated at 130–150° C.—mostly at about 140° C.—during hydrogenation. Ammonia synthesis gas comprising about 75% $H_2$ and 25% $N_2$ was passed through the batch at 60 p. s. i. g. pressure and temperatures between 130° C. and 150° C. for the period of time indicated in column 4. Hydrogenation was discontinued when the setting point of a sample of the batch reached a satisfactory value, circa 22 or 23° C., or when the setting points of successive samples failed to show an increase with continued hydrogenation. After hydrogenation and agitation was stopped, the batch was allowed to settle out for about four hours whereafter the product was decanted from the lower layer or "heel" of settled catalyst. The next batch of molten phenol was then charged and processed. Nickel Nacconol was added to the first batch to assist in decontaminating the hydrogenation equipment, which was new. New equipment is prone to contaminate catalyst and give erratic results so that it is often necessary to sacrifice the product and/or catalyst used in the first batch until the equipment has been "broken in."

The catalyst lost activity during batch No. 5 (as evidenced by a cyclohexanol setting point of 8° C.) and went completely dead during batch No. 6. Samples of dead catalyst were subjected to numerous laboratory tests. It was found that the catalyst could be used at activity levels approaching the original value if nickel Nacconol was added to the reaction medium. This result was surprising because it was unsuspected that nickel Nacconol or any other similar or dissimilar substance had a remedial power to undo the effects of catalyst poisoning when used in situ during processing.

Accordingly 15 lbs. of nickel Nacconol were added to batch No. 6, which was finished successfully as to hydrogenation time and product quality. The hitherto dead catalyst was thereafter used at normal activity levels for 16 successive batches.

Catalyst selectivity fell off at batch 14 when the maximum setting point of cyclohexanol product obtained was 18.5° C. This was the culmination of a trend of successively lower setting points occurring through batches 9 to 14 inclusive. Addition of 5 lbs. of nickel Nacconol to batch 15 caused a reversal of this trend and enabled the catalyst to be used successfully for 6 more batches.

Further experience with the process of this example has shown that use of nickel Nacconol makes it possible to hydrogenate about 33 batches of 22,000 gallons phenol each to a cyclohexanol product having a setting point averaging above 23° C. with a single charge of 350 lbs. of ignited nickel-on-silica catalyst. Nickel Nacconol is added when a fall off of catalyst activity occurs as indicated by low setting point of product. Usually this occurs but once in a batch and between batch 10 and batch 20. Addition of nickel Nacconol to the first batch is not necessary, although it may be useful when new equipment is used for the first time. Moreover the final loss of catalyst activity results in part from a cumulative loss of catalyst in the decanted product; this loss amounts on the average to about 5 lbs. of catalyst per batch. It is advantageous to recover this catalyst as a concentrated catalyst-in-cyclohexanol slurry by passing the decantate through a cream-separator type centrifuge. By combining use of nickel Nacconol to maintain catalyst activity with centrifugal separation of decanted catalyst, it is possible to use the catalyst for an indefinitely prolonged period far surpassing that obtainable by prior art methods. For example, Brochet, Comptes Rendus (Paris), volume 175, pp. 583–5 (1922) reports that an unsupported nickel catalyst used in phenol hydrogenation by a process similar to that of this example lost its activity after use in nine successive batches.

*Table 1*

USE OF NICKEL NACCONOL TO RESTORE ACTIVITY OF DEACTIVATED NICKEL HYDROGENATION CATALYST

| Batch No. | Phenol charged, gallons | Nickel Nacconol Charged, pounds | Hydrogenation Time, hours | Product Setting Point, ° C. |
|---|---|---|---|---|
| 1 | 2,200 | 20 | 19 | 13.2 |
| 2 | 2,200 | | 24 | 20.4 |
| 3 | 2,200 | | 16 | 21.8 |
| 4 | ¹ 1,300 | | 23 | |
| 5 | 2,200 | | 24 | 8.0 |
| 6 | 2,200 | 15 | 20 | 19.8 |
| 7 | 1,300 | | 15 | 22.4 |
| 8 | 1,300 | | 17 | 22.8 |
| 9 | 1,300 | | 13 | 23.4 |
| 10 | 1,300 | | 13 | 23.6 |
| 11 | 1,300 | | 12 | 23.5 |
| 12 | 1,300 | | 14 | 22. |
| 13 | 1,300 | | 14 | 21.6 |
| 14 | 1,300 | | 14 | 18.5 |
| 15 | 1,300 | 5 | 15 | 22.6 |
| 16 | 1,300 | | 17 | 20.8 |
| 17 | (²) | | 4½ | 24.1 |
| 18 | 1,750 | | 17 | 23.2 |
| 19 | 1,300 | | 13 | 22.8 |
| 20 | (²) | | 5 | 24.5 |
| 21 | 1,300 | | 10 | 23.0 |
| 22 | 1,300 | | | 0 |

¹ Mechanical defects in agitation equipment necessitated a reduction in phenol charge in this and most subsequent batches.
² Charge material was partially hydrogenated phenol condensed from effluent gas of other units and here reprocessed.

EXAMPLE 2

In this example the restorative effects of various additives on the activity of spent phenol hydrogenation catalyst are compared.

Fresh catalyst in the control experiments was prepared as described in the fore part of Example 1. The spent catalyst used to evaluate the additives was a homogeneous composite of the same type of catalyst which had had its activity impaired by prolonged use in the hydrogenation of phenol as described in Example 1.

The nickel Nacconol additive tested was prepared as described in Example 1. The Nacconol salts of copper, silver, iron and cobalt tested were prepared by a similar procedure from the following starting materials: cupric carbonate containing a small amount of cupric hydroxide; silver hydroxide; ferrous hydroxide and cobaltous hydroxide. The same general procedure was also used to prepare nickelous benzene sulfonate and nickelous toluene sulfonate by addition of basic nickel carbonate to aqueous benzene sulfonic acid or toluene sulfonic acid. The cobaltous naphthenate tested was a commercial product containing 6% cobalt and vended under the name "Nuolate" by Nuodex Products Inc. of Elizabeth, N. J.

The nickelous "Lorol" sulfate was prepared by use of "Lorol No. 5," a mixture of straight chain normal alcohols marketed by E. I. du Pont de Nemours and Co., and comprising 2.6% of decyl alcohol, 61.0% lauryl alcohol (dodecanol-1), 23.0% of myristyl alcohol (tetradecanol-1), 11.2% of cetyl alcohol (hexadecanol-1) and 2.2% of stearyl alcohol (octadecanol-1). This mixture of alcohols was reacted with chlorosulfonic acid to obtain a corresponding mixture of monoalkyl sulfates. These were neutralized with basic nickelous carbonate in aqueous medium of the "neutral neutralization" technique, i. e. increments of "Lorol" acid sulfate and basic nickel carbonate were successively added to the medium to keep the pH at between 6.5 and 7. The resulting solution was filtered and evaporated to recover the product.

The tests were carried out at 145° C. and atmospheric pressure, with agitation, in experimental hydrogenation equipment. The hydrogenator charge consisted of a phenol, 5% by weight on the total charge of catalyst, 0.8% by weight on the total charge of additive (where used) and 1% or 1.2% by weight on the total charge of sodium carbonate (where used).

Table 2 summarizes the restorative effect of various additives on the activity of spent hydrogenation catalyst.

Table 2 gives the average rate of hydrogen absorption in standard cubic feet per hour for each test. Hydrogen consumed by the reaction was measured for the four hour period following the time the batch reached reaction temperature.

Table 2 gives the relative activity of the catalyst under test conditions compared to the activity of fresh catalyst. The relative activity is calculated by the formula $$\frac{\text{Average hydrogen absorption}}{\text{Average hydrogen absorption of fresh catalyst}} \times 100$$

Table 2 gives the relative activity of the additive in terms of a standard activity value of 100 for nickel Nacconol. The relative activity of the additive is calculated by the expression $$\frac{\text{Average hydrogen absorption of test} - \text{Average hydrogen absorption with spent catalyst}}{\text{Average hydrogen absorption with spent catalyst and nickel Nacconol} - \text{Average hydrogen absorption with spent catalyst}} \times 100$$

The data of Table 2 shows the following relative to the restorative activity of the additives tested: (1) nickelous Nacconol and silver Nacconol both have good restorative properties and are of equal activity; (2) nickelous "Lorol" sulfate is superior to nickelous Nacconol; (3) nickelous carbonate has an insignificant effect on activity and (4) cupric Nacconol, cobaltous Nacconol, cobaltous naphthenate and ferrous Nacconol are catalyst poisons which stop the reaction entirely.

Table 2
RESTORATIVE EFFECT OF VARIOUS ADDITIVES ON THE ACTIVITY OF SPENT HYDROGENATION CATALYST

| Catalyst | Percent Na$_2$CO$_3$ | Additive | H$_2$ Absorption Rate, s. c. f./hr. | Relative Activity of Catalyst | Relative Activity of Additive |
|---|---|---|---|---|---|
| Fresh | 1.0 | None | 0.33 | 100 | |
| Spent | 1.0 | do | 0.07 | 21 | |
| Do | 1.0 | Nickelous Nacconol | 0.28 | 85 | 100 |
| Do | 1.0 | Nickelous "Lorol" Sulfate | 0.39 | 118 | 152 |
| Do | 1.0 | Silver Nacconol | 0.28 | 85 | 100 |
| Do | 1.0 | Ferrous Nacconol | (¹) | (¹) | |
| Do | 1.0 | Cobaltous Nacconol | (¹) | (¹) | |
| Do | 1.0 | Cupric Nacconol | (¹) | (¹) | |
| Do | 1.0 | Cobaltous Naphthenate | (¹) | (¹) | |
| Fresh | 1.2 | None | 0.31 | 100 | |
| Spent | 1.2 | do | 0.06 | 19 | |
| Do | 1.2 | Nickelous Nacconol | 0.28 | 90 | 100 |
| Fresh | None | None | 0.36 | 100 | |
| Spent | None | do | 0.08 | 22 | |
| Do | None | Nickelous Nacconol | 0.29 | 81 | 100 |
| Do | None | NiCO$_3$ | 0.10 | 28 | 10 |

¹ System poisoned.

Although certain preferred embodiments of the invention have been disclosed for purpose of illustration, it will be evident that various changes and modifications may be made therein without departing from the scope and spirit of the invention.

I claim:

1. A process for reactivating a nickel catalyst deteriorated by use in the liquid phase hydrogenation of phenol which comprises adding to the nickel catalyst a metal salt of a surface active compound containing 6–30 carbon atoms, said salt having the general formula:

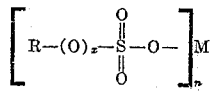

wherein R is an organic radical selected from the group consisting of hydrocarbon radicals and substituted hydrocarbon radicals, $x$ is 1 or 0, M is a member selected from the group consisting of Ni and Ag, and $n$ stands for one of the numbers 1 and 2 and satisfies the valence of M.

2. A process for reactivating a nickel catalyst deteriorated by use in the liquid phase hydrogenation of phenol which comprises adding to the nickel catalyst a metal salt of a surface active compound containing 6–30 carbon atoms, said salt having the general formula:

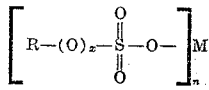

wherein R is an organic radical selected from the group consisting of hydrocarbon radicals and substituted hydrocarbon radicals, $x$ is 1 or 0, M is Ni, and $n$ stands for the number 2 and satisfies the valence of M.

3. A process for reactivating a nickel catalyst deteriorated by use in the liquid phase hydrogenation of phenol which comprises adding to the nickel catalyst a metal salt of a surface active compound containing 6–30 carbon atoms, said salt having the general formula:

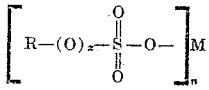

wherein R is an organic radical selected from the group consisting of hydrocarbon radicals and substituted hydrocarbon radicals, $x$ is 1 or 0, M is Ag, and $n$ stands for the number 1 and satisfies the valence of M.

4. In a process for the production of cyclohexanol by the hydrogenation of phenol in the liquid state in the presence of a used nickel-on-silica catalyst, the improvement which comprises maintaining said used nickel-on-silica catalyst at high activity by the addition of a metal salt of a surface active compound containing 6–30 carbon atoms, said salt having the general formula:

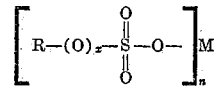

wherein R is an organic radical selected from the group consisting of hydrocarbon radicals and substituted hydrocarbon radicals, $x$ is 1 or 0, M is a member selected from the group consisting of Ni and Ag, and $n$ stands for one of the numbers 1 and 2 and satisfies the valence of M, in an amount of about 0.01%–1.5% by weight of the phenol subjected to hydrogenation.

5. A process for reactivating a nickel catalyst deteriorated by use in the liquid phase hydrogenation of phenol which comprises adding to the nickel catalyst a nickel salt of an alkane sulfonic acid containing 6–30 carbon atoms.

6. A process for reactivating a nickel catalyst deteriorated by use in the liquid phase hydrogenation of phenol which comprises adding to the nickel catalyst a nickel salt of a sulfated alcohol containing 6–30 carbon atoms.

7. A process for reactivating a nickel catalyst deteriorated by use in the liquid phase hydrogenation of phenol which comprises adding to the nickel catalyst a nickel salt of an aromatic sulfonic acid containing 6–30 carbon atoms.

8. A process for reactivating a nickel catalyst deteriorated by use in the liquid phase hydrogenation of phenol which comprises adding to the nickel catalyst a nickel salt of an alkyl aromatic sulfonic acid containing 6–30 carbon atoms.

9. A process for reactivating a nickel catalyst deteriorated by use in the liquid phase hydrogenation of phenol which comprises adding to the nickel catalyst a nickel salt of an aralkyl sulfonic acid containing 6–30 carbon atoms.

10. In a process for the hydrogenation of phenol in the liquid state in the presence of a used nickel catalyst, the improvement which comprises maintaining said used nickel catalyst at high activity by the addition of a metal salt of a surface active compound containing 6–30 carbon atoms, said salt having the general formula:

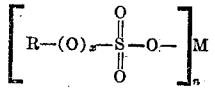

wherein R is an organic radical selected from the group consisting of hydrocarbon radicals and substituted hydrocarbon radicals, $x$ is 1 or 0, M is a member selected from the group consisting of Ni and Ag, and $n$ stands for one of the numbers 1 and 2 and satisfies the valence of M.

No references cited.